(12) United States Patent
Sullivan

(10) Patent No.: US 8,749,193 B1
(45) Date of Patent: Jun. 10, 2014

(54) BATTERY PROTECTION CIRCUIT FOR MULTIPLE BATTERY POWER SUPPLY AND CHARGING SYSTEM

(71) Applicant: InPower LLC, Galena, OH (US)

(72) Inventor: James D. Sullivan, Galena, OH (US)

(73) Assignee: InPower LLC, Galena, OH (US)

( * ) Notice: Subject to any disclaimer, the term of this patent is extended or adjusted under 35 U.S.C. 154(b) by 0 days.

(21) Appl. No.: 13/891,453

(22) Filed: May 10, 2013

(51) Int. Cl.
*H02J 7/00* (2006.01)

(52) U.S. Cl.
USPC .......................................... 320/104; 307/10.7

(58) Field of Classification Search
USPC .......................................... 320/104; 307/10.7
See application file for complete search history.

(56) References Cited

U.S. PATENT DOCUMENTS

| | | | |
|---|---|---|---|
| 5,162,720 A | 11/1992 | Lambert | |
| 5,488,283 A | 1/1996 | Dougherty et al. | |
| 5,838,136 A | 11/1998 | Waugh | |
| 6,275,001 B1 | 8/2001 | Dierker | |
| 6,452,361 B2 * | 9/2002 | Dougherty et al. | 320/104 |
| 6,476,583 B2 * | 11/2002 | McAndrews | 320/119 |
| 6,545,445 B1 | 4/2003 | McDermott et al. | |
| 6,639,384 B2 * | 10/2003 | Hasegawa et al. | 320/126 |
| 2012/0316716 A1 * | 12/2012 | Odani et al. | 701/22 |

* cited by examiner

*Primary Examiner* — Richard V Muralidar
(74) *Attorney, Agent, or Firm* — Frank H. Foster; Kremblas & Foster

(57) ABSTRACT

A battery protection circuit for connection to a vehicle's auxiliary battery, auxiliary battery load and chassis battery that is connected to the vehicle's alternator. A switching control circuit, including a digital processor, has a voltage sensing circuit connected to the alternator, a voltage sensing circuit connected to the auxiliary battery, a ground terminal for connection to the vehicle's common ground and outputs for controlling switches. An electrically controlled first switch is interconnected between the alternator and the auxiliary load. The first switch has a control input terminal connected to an output of the control circuit for being switched between a closed state and an open state. An electrically controlled second switch is interconnected between the auxiliary load and the auxiliary battery. The second switch has a control input terminal connected to an output of the control circuit for being switched between a closed state and an open state.

Figure 1:
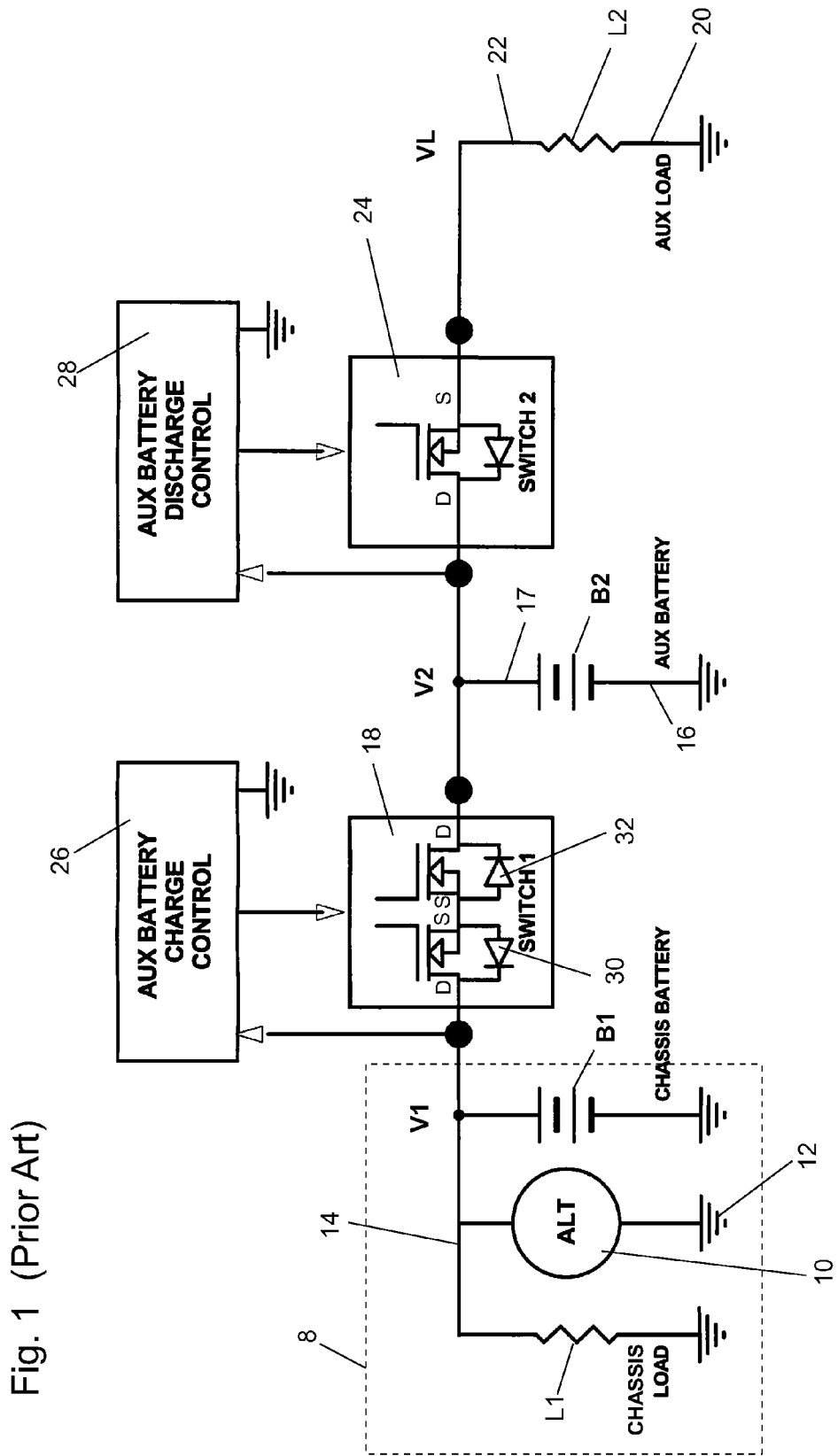

20 Claims, 3 Drawing Sheets

US 8,749,193 B1

BATTERY PROTECTION CIRCUIT FOR MULTIPLE BATTERY POWER SUPPLY AND CHARGING SYSTEM

BACKGROUND OF THE INVENTION

This invention relates to battery power systems and more particularly relates to a battery isolation or protection circuit for a multi-battery power system of the type commonly used on special purpose motor vehicles that are equipped with tools, appliances or other electrically powered equipment that require more than the single battery that is conventional on a motor vehicle. The invention is capable of protecting the multiple batteries when the batteries are of different types, such as when the auxiliary battery is a gel cell battery, and also reduces the heat dissipated by the protection circuit and its cost.

Vehicle manufacturers design and build a variety of general purpose vehicles with an electrical system that includes a chassis battery for starting the engine and supplying power for operating the electrical loads that are the vehicle accessories, such as its lights and electronic equipment. These electrical components are typically installed by the manufacturer on the vehicle chassis because they are necessary for operating the vehicle or desired by vehicle owners for typical uses of the vehicle. A flooded cell, lead-acid battery is the industry standard chassis battery. An electrical power generator that is driven by the engine is also included with the chassis components for charging the chassis battery and supplying electrical power to the chassis loads. In most modern vehicles the electrical power generator is an alternator although it can alternatively be a DC generator or other device that generates electrical power for charging batteries and for operating electrical loads as well as the associated electrical devices that are commonly installed by vehicle manufacturers. The electrical power generator and the chassis battery have terminals connected to a common ground on the vehicle and ungrounded terminals that are electrically connected together so that those components are electrically connected in parallel. The electrical power generator has its own electronic control that is capable of varying the power generator's output voltage as a function of one or more sensed inputs.

However, some vehicles are additionally equipped with special purpose electrical equipment which must also be supplied with electrical power. Examples are utility work vehicles, emergency vehicles and motor homes. These vehicles are often manufactured by specialized companies which purchase a chassis from vehicle manufacturers and outfit the chassis with added equipment. Because the special purpose equipment usually has a high power demand, the vehicles are provided with an auxiliary battery so that the vehicle has both a chassis battery and an auxiliary battery. The auxiliary battery has a terminal connected to the common ground and can supply electrical power to operate auxiliary loads such as power tools, medical equipment or appliances in a motor home. The auxiliary battery avoids the need to run the engine and its alternator to power the auxiliary loads and maintain the chassis battery in a charged state. Operating the engine of a motor home disturbs neighbors, especially at night. Additionally, in some locations, commercial vehicles that arrive at a work site are required to stop running their engines and are prohibited from running generators in order to prevent exhaust pollution, reduce noise and conserve fuel. Because the auxiliary loads need power from somewhere, an auxiliary battery is installed.

Unfortunately, many vehicle owners treat their auxiliary batteries carelessly. They leave electrical loads on when not being used, even when the vehicle is parked overnight. Such neglect discharges the auxiliary battery, often to a completely discharged state.

The prior art developed protection circuits known as battery isolators, battery separator switches or auxiliary battery disconnect switches. Because it is undesirable to modify the standard chassis wiring of a vehicle, protection circuits are confined to connections to battery terminals and the vehicle's common ground. The protection circuit must meet several operating needs. These include: (1) at times connecting the vehicle's electrical power generator to the auxiliary battery so it can charge the auxiliary battery as needed but without altering the charging of the chassis battery in the manner designed by the vehicle manufacturer, (2) at times disconnecting the auxiliary loads from the auxiliary battery if the auxiliary battery becomes excessively discharged and (3) at times separating the auxiliary battery from the chassis battery in order to prevent the auxiliary battery and its auxiliary loads from discharging the chassis battery and rendering it unable to start the vehicle engine.

FIG. 1 is an illustration of two prior art battery protection circuits that are drawn similarly to drawings of the invention in order to make clear both the similarities and important differences between the circuitry of the prior art and the circuitry of the present invention. A vehicle from a vehicle manufacturer has a chassis electrical power system 8 that comprises a chassis battery B1, an electrical power generator 10, typically an alternator, and a chassis load L1 (a composite of the multiple individual chassis loads). All have a terminal connected to a common ground 12 and an ungrounded terminal 14 electrically connected together so they are in parallel electrical connection. Chassis battery charging and the supply of power to the chassis loads is independently controlled by the alternator control system and switches included in the chassis electrical system by the vehicle's manufacturer. An auxiliary battery B2 has a grounded terminal 16 and an ungrounded terminal 17. An electrically controlled battery separator switch 18 is interposed in direct electrical connection between the ungrounded chassis battery terminal 14 of the chassis battery power system 8 and the ungrounded auxiliary battery terminal 17. An auxiliary load L2 has a grounded terminal 20 and an ungrounded terminal 22 that is connected through an electrically controlled switch 24 to the ungrounded terminal 17 of the auxiliary battery B2.

The auxiliary battery often consists of a bank of several parallel connected batteries. The chassis battery may also be more than one battery. The chassis load and the auxiliary load usually consist of several individual electrical loads. For simplicity, the singular terms "load" and "battery" and single symbols are used to represent the equivalent composite of the multiple loads and batteries that are commonly installed on vehicles.

The switch 18 is controlled by an auxiliary battery charge control circuit 26 that switches the switch 18 to an open or closed state. The auxiliary battery charge control circuit 26 includes a voltage sensing circuit and the switch 18 is switched as a function of the chassis battery B1 voltage V1 which is identical to the voltage of the power generator 10 because they are connected in parallel. Switch 18 is closed and connects the auxiliary battery B2 directly to the vehicle's power generator 10 and battery B1 when the voltage V1 at terminal 14 is sufficiently above the fully charged state of the chassis battery, for example 13.2 volts, so that the power generator 10 will charge the auxiliary battery B2 and, if switch 24 is closed, also supply power to the auxiliary load L2. Switch 18 is opened when the power generator 10 voltage V1 falls to a level, for example 12.8 volts, that indicates that the chassis battery B1 is being charged, in order to maintain the chassis battery B1 in a fully charged state that is capable of starting the engine.

It is important to note that the first switch 18 of the prior art circuit is controlled only by the sensed value of the voltage V1 at the terminal 14 of the chassis electrical power system 8. The fact that the first switch 18 is closed for a sensed voltage V1 that is greater than some fully charged voltage (for example 13.2 volts) means that switch 18 is also closed for larger voltages. Consequently, the highest voltage that the vehicle's voltage regulator causes the power generator 10 to have is also applied to the auxiliary battery. As will be seen from subsequent description, in modern vehicles the power generator 10 can reach voltages that damage or destroy a battery if it is a gel battery. But the prior art circuit does not protect against that problem.

The switch 24 is controlled by an auxiliary battery discharge control circuit 28 that switches the switch 24 to an open or closed state. The auxiliary battery discharge control circuit 28 includes a voltage sensing circuit and the switch 24 is switched as a function of the auxiliary battery B2 voltage V2. Switch 24 is closed to connect the auxiliary battery B2 to the auxiliary load L2 when the voltage of the auxiliary battery B2 is high enough, for example greater than 11 volts. Switch 24 is opened when the voltage V2, for example 10 volts, of the auxiliary battery B2 indicates that it is discharged and therefore further discharge should be prevented.

These prior art circuits perform well, are reliable and provide a long battery lifetime when both the chassis battery and the auxiliary battery are flooded cell batteries, which have essentially the same electrical characteristics. However, this prior art circuit has some deficiencies.

One deficiency is that the switch 18 requires two series connected MOS/FETs. It requires two series MOS/FETs because switch 18 must be able to block current flow in both directions when switch 18 is open. If current could flow through the MOS/FETs in one or the other direction when switch 18 is open, either the auxiliary battery B2 and/or the auxiliary load L2 could discharge the chassis battery B1 or the chassis electrical power system 8 could discharge the auxiliary battery B2. Because every MOS/FET has an inherent diode between its source and drain, for example the diodes 30 and 32, if switch 18 were a single MOS/FET, a discharging current could flow from one battery to the other through the inherent diode. The requirement for two MOS/FETs has two important consequences for this prior art circuit. Although MOS/FETs that are designed for switching high currents are relatively low resistance devices, these circuits operate with very high currents that result in considerable heat dissipation in each MOS/FET making heat sinks necessary. As will be seen in the description of the invention, the improved circuit of the invention requires only one MOS/FET in each of its two switches. One consequence is that the circuit of the invention reduces the heat dissipation, and resulting energy waste, by 66% when current is supplied by the vehicle power generator to the auxiliary load. The second consequence is that the circuit cost is reduced by the elimination of one MOS/FET.

In addition to the above-described deficiencies with the prior art circuits, an additional problem has arisen because of relatively recent developments in battery technology that better meet the needs of an auxiliary battery but that also create problems for prior art battery protection circuits. The development is the gel battery. Before its development, the standard storage battery for decades has been the flooded cell, lead acid battery which has a liquid electrolyte and a solid physical separator to mechanically hold the electrodes in separated positions. The gel battery, more specifically the gelled electrolyte lead acid battery, has its electrolyte retained in a gel. A further development has been the advanced glass mat (AGM) lead acid battery in which the separator is essentially a sponge-like glass mat. Additional developments can be expected in the future to which the present invention is applicable.

The gel battery has numerous advantages. The chassis battery and the auxiliary battery must meet different demand conditions which make their electrical requirements different. The chassis battery needs to be capable of providing a very high current for a relatively short time period in order to start the vehicle. It also needs to supply the relatively low current demand for operating the vehicle accessories. The auxiliary battery needs to be a deep cycle battery that can supply a large current for a long period of time and can withstand numerous repetitive deep cycle discharges and recharges.

Deep cycle flooded cell batteries have long been used as auxiliary batteries. But flooded cell batteries are capable of a relatively limited number of deep cycles, for example about 250 deep cycles. Gel batteries are capable of a far greater number of deep cycle discharges and recharges, for example 700 deep cycles. Because of this extended capability, gel batteries are now used for auxiliary batteries sometimes in a group of ten on some commercial vehicles. However, because flooded cell batteries exhibit characteristics that make them more suitable for use as chassis batteries, gel batteries are not used as chassis batteries. The result is that vehicles are now being equipped with two different types of batteries with different physical, electrical and chemical properties. Typically the chassis battery is a flooded cell battery and the auxiliary battery is a gel battery. Although the prior art battery protection circuits have adequately protected vehicles that use flooded cell batteries for both the chassis battery and the auxiliary battery, they do not adequately protect vehicles with the two different battery types.

Although gel batteries have the capability for better performance and longer service lifetimes as auxiliary batteries than the flooded cell batteries, they have not reached their potential because they are protected by prior art battery protection circuits which provide inadequate protection of gel batteries. Consequently, the experience of users in the field has been that gel auxiliary batteries have exhibited a useful lifetime and performance that are considerably less than their capabilities.

Therefore, it is an object and feature of the present invention to provide a battery protection circuit that can adequately protect both a gel battery used as an auxiliary battery when connected to a vehicle alternator and a vehicle flooded cell battery, despite the difference in the electrical characteristics of the two batteries.

It is a further object and feature of the invention to provide a battery protection circuit in which the heat dissipation generated by the electrically controlled switches, such as MOS/FETs, is reduced by two thirds and therefore dissipating only one third the power dissipated by the prior art protection circuits.

It is a further object and feature of the invention to provide a battery protection circuit of reduced cost by elimination of a circuit component that has been necessary in the prior art battery protection circuits.

BRIEF SUMMARY OF THE INVENTION

The invention is a battery protection circuit for connection to a vehicle's auxiliary battery, auxiliary battery load and chassis battery that is connected to the vehicle's alternator.

The invention has a switching control circuit including a digital processor. The control circuit has a voltage sensing circuit connected to the alternator, a voltage sensing circuit connected to the auxiliary battery, a ground terminal for connection to the vehicle's common ground and outputs for controlling switches. An electrically controlled first switch is interconnected between the alternator and the auxiliary load. The first switch also has a control input terminal connected to an output of the control circuit for being switched between a closed state and an open state by the control circuit. An electrically controlled second switch is interconnected between the auxiliary load and the auxiliary battery. The second switch also has a control input terminal connected to an output of the control circuit for being switched between a closed state and an open state by the control circuit.

BRIEF DESCRIPTION OF THE SEVERAL
VIEWS OF THE DRAWINGS

Figure 2:
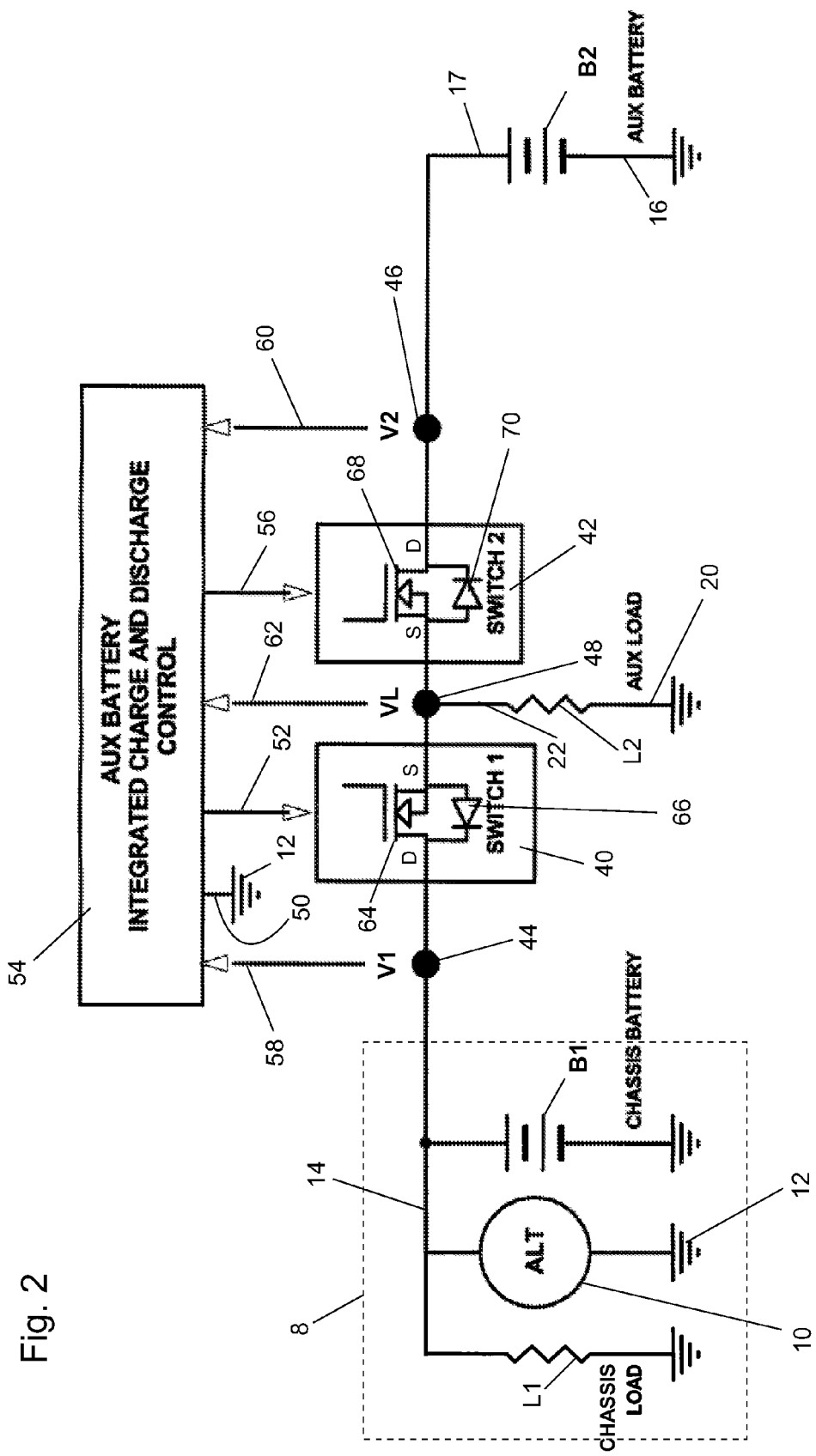
Figure 3:
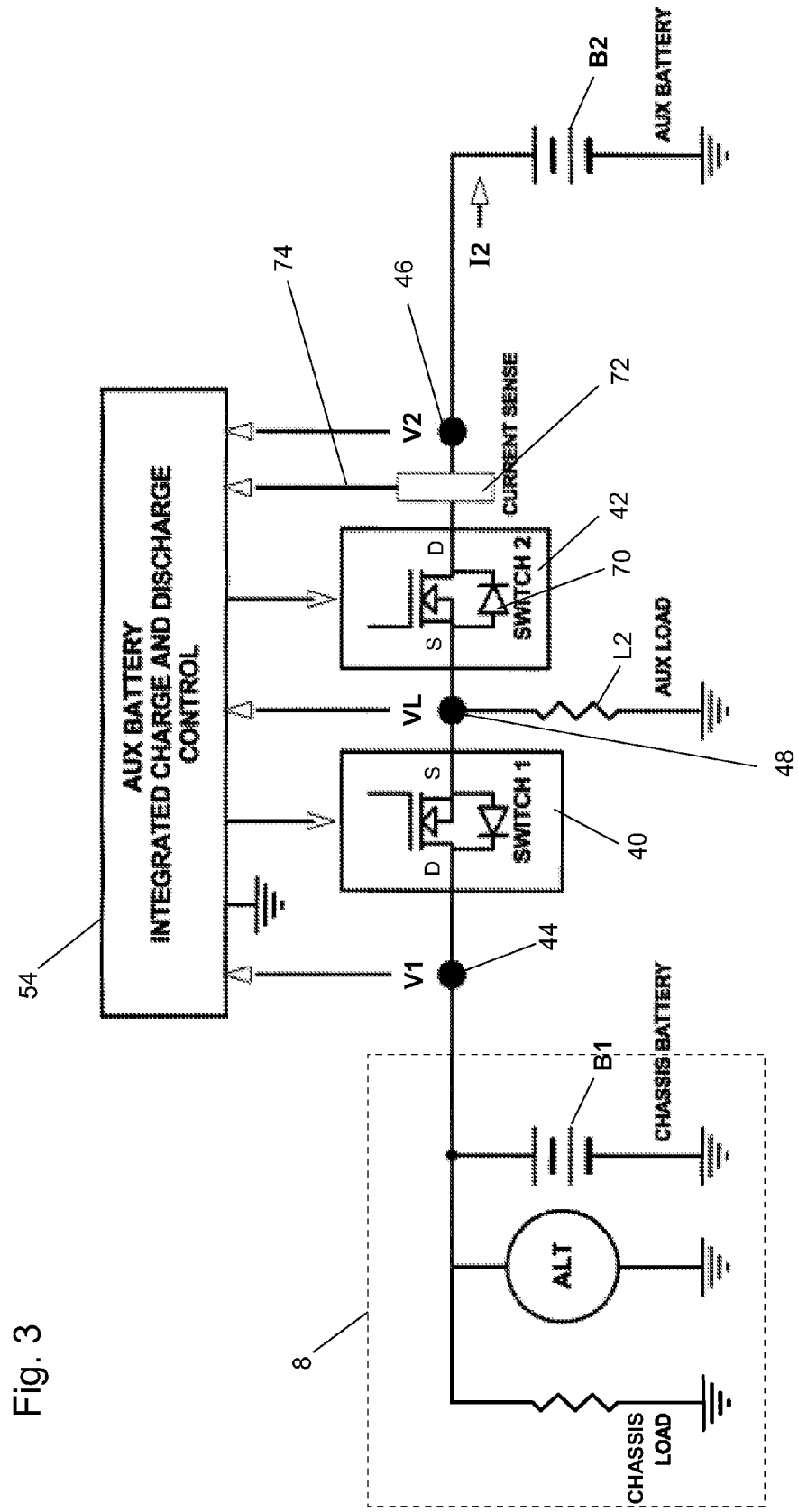

FIG. 1 is a schematic diagram of a prior art battery protection circuit.
FIG. 2 is a schematic diagram of an embodiment of the invention.
FIG. 3 is a schematic diagram of an alternative embodiment of the inventions.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are used. They are not limited to direct connection, but include connection through other circuit elements where such connection is recognized as being equivalent or providing equivalent operation by those skilled in the art.

DETAILED DESCRIPTION OF THE INVENTION

FIG. 2 illustrates an embodiment of the invention which is a three terminal device. The chassis electrical power system 8, the auxiliary battery B2 and the auxiliary load L2 are the same as in the prior art and therefore have the same reference numerals as in FIG. 1. However, a very important difference is that those components are connected differently to the three high current terminals and therefore are connected differently to the two switches 40 and 42. As with the prior art, one end terminal 44 is connected to the chassis electrical power system 8. However, the positions of the auxiliary battery B2 and the auxiliary load L2 have been interchanged. The auxiliary battery B2 is connected to the opposite end terminal 46 and the auxiliary load L2 is connected to the center terminal 48. This interchange of these connections allows the circuit to provide the improvements of the invention.

This difference in circuit topology together with its control algorithm provides protection for a vehicle electrical system that has both a chassis battery and an auxiliary battery for an auxiliary load where the batteries are mixed dissimilar types, a flooded cell chassis battery and a gel cell auxiliary battery. The circuit provides all the protections and functions of the prior art and additionally prevents (1) overcharging of the auxiliary battery (especially gel type) to prevent damage from overcharge and (2) undercharging of the auxiliary battery to prevent damage from undercharge. Incremental damage occurs each time the battery remains at a charge state of undercharge or overcharge and this damage cumulatively shortens the battery's lifetime. The circuit of the invention is able to provide protection despite the fact that the batteries have different electrical characteristics and therefore the voltage that represents an overcharged state and the voltage that represents an undercharged state are different for the chassis battery and the auxiliary battery.

Referring in more detail to FIG. 2, the circuit has circuit node connection terminals that include a power generator node 44 for connection to the ungrounded terminal of the power generator 10, an auxiliary battery node 46 for connection to the ungrounded terminal 17 of the auxiliary battery B2, and an auxiliary load node 48 for connection to the ungrounded terminal of the auxiliary load L2. The electrically controlled first switch 40 is interconnected between the power generator node 44 and the auxiliary load node 48. The first switch 40 has a control input terminal 52 connected to an output of a control circuit 54. The control circuit 54 switches the first switch 40 between a closed state and an open state as dictated by the control algorithm embodied in software stored in the control circuit 54. The electrically controlled second switch 42 is interconnected between the auxiliary load node 48 and the auxiliary battery node 46. The second switch 42 has a control input terminal 56 connected to an output of the control circuit 54. The control circuit 54 switches the second switch 42 between a closed state and an open state as dictated by the control algorithm embodied in software stored in the control circuit 54.

The switching control circuit 54 includes a digital processor, such as a microprocessor, microcontroller, digital signal processor or other computing circuit of which there are many kinds known to those skilled in the art. The control circuit 54 also has a voltage sensing circuit connected by a conductor 58 to the power generator node 44 and another voltage sensing circuit connected by a conductor 60 to the auxiliary battery node 46. The digital processor also includes the necessary A/D and D/A converters and other circuits that are commonly used in the prior art in order to input, output and process its signals and data. The control circuit 54 has a ground node 50 for connection to the common ground 12. Although not necessary for all embodiments of the invention, the control circuit advantageously has a voltage sensing circuit that is connected by a conductor 62 to the center auxiliary load node 48 for inputting voltage information to allow additional control algorithms to be incorporated into the software stored in the control circuit 54.

The first switch 40 has one MOS/FET 64 in series connection between the power generator node 44 and the auxiliary load node 48. The second switch 42 has one MOS/FET in series connection between the auxiliary load node 48 and the auxiliary battery node 46. The term "one MOS/FET is series connection" means that there are not two or more series connected MOS/FETs. As well known to those skilled in the art, high current MOS/FETs are constructed by forming a large number of parallel MOS/FET devices each carrying a portion of the total current. Each high current MOS/FET is a composite of many parallel MOS/FETs. They are fabricated that way so that they can control and carry a large current. But the preferred embodiments of the invention have only one composite MOS/FET in series between the terminal nodes. Consequently, there can be many parallel connected individual MOS/FETs to make a composite MOS/FET switch. But there are not any others in series connected between those nodes although there can be others in parallel connection. In other words, there is only one common drain terminal and one common source terminal between the nodes 44 and 48.

Because the first switch 40 has only one MOS/FET between the terminal nodes 44 and 48, instead of two as in the prior art, the amount of heat dissipated by the first switch 40 is half the amount of heat dissipated by the switch 18 of FIG. 1 for the same current in both. Only one MOS/FET is required for the first switch 40 because the auxiliary load L2, not the auxiliary battery, is connected to the center node 48. The first switch 40, when open, is only required to block current in one direction which is from the chassis battery B1 to the auxiliary load node 48. Because the auxiliary battery is not connected to the center node 48, a second MOS/FET is not necessary for blocking current through the inherent diode of another series connected MOS/FET. The MOS/FET 64 has its source connected to the auxiliary load node 48 and its drain connected to the power generator node 44. When the first switch 40 is open, its inherent diode 66 will not conduct current from the chassis battery B1 to the auxiliary load node 48 because the diode 66 is connected in a polarity with its anode connected to the auxiliary load node 48 and its cathode connected to the power generator node 44. Consequently, current flow from the chassis battery B1 to the auxiliary load node 48 can not flow through the inherent diode 66 because that direction is opposite to the conduction direction of a diode.

The improved circuit topology of the invention not only allows the elimination of one MOS/FET, but the elimination of a MOS/FET combined with the difference in circuit topology reduces the heat dissipation by two thirds for current supplied by the vehicle's power generator to the auxiliary load. The dissipation reduction occurs because, in the invention, that current only has to pass through one MOS/FET device instead of three as in the prior art. In the prior art, if the vehicle engine is running and both the chassis and auxiliary batteries are charged, the alternator supplies current to the auxiliary load. As can be seen in the prior art circuit of FIG. 1, that current flows through all three MOS/FETs dissipating one third of the dissipated power in each MOS/FET. In the circuit of the invention, with the alternator current being supplied to the auxiliary load, the alternator current only passes through one MOS/FET to drive the load. So there is only one third the power dissipation which gives a 66% reduction in power lost by the generation of heat in the internal resistance of the MOS/FET.

The second switch 42 has one MOS/FET 68 that also includes an inherent diode 70. The MOS/FET 68 is connected with its source connected to the auxiliary load node 48 and its drain connected to the auxiliary battery node 46. Consequently, the inherent diode 70 of the MOS/FET 68 is connected with its anode connected to the auxiliary load node 48 and its cathode connected to the auxiliary battery node 46. As with the MOS/FET 64 of the first switch 40, the diode 70 of the MOS/FET 68 also has a polarity that prevents current flow from the auxiliary battery B2 to the auxiliary load L2. Consequently, when the second switch 42 is open, discharging current from the auxiliary battery is blocked.

Importantly, however, the inherent diode 70 of the second switch 42 is able to serve a useful circuit function because of the arrangement of the auxiliary battery B2 at the end node 46 and the auxiliary load L2 at the central node 48. Even when the second switch 42 is open in order to isolate and protect the auxiliary battery B2 from further discharge, pulses of charging current, that can charge the auxiliary battery B2, can flow through the inherent diode 70 if the first switch 40 is closed. Comparison of the circuit of FIG. 2 to the prior art of FIG. 1 reveals that there is no way that the prior art would allow a current to charge (but not discharge) a battery through an open switch.

FIG. 3 illustrates an alternative embodiment of the invention that is alternative in the sense that auxiliary battery current sensing is added to the circuit of FIG. 2 in order to permit the application of additional control algorithms to the switching of the first and/or second switch. Because most of the circuit is identical to the circuit illustrated in FIG. 2, the same reference numerals are used for the same components. Referring to FIG. 3, the protection circuit of FIG. 3 has a current sensing circuit 72 of a type known to those skilled in the art. An element of the current sensing circuit 72 is series connected with the second switch 42 and is interposed between the auxiliary battery node 46 and the auxiliary load node 48. Preferably it is interposed between the auxiliary battery node 46 and the second switch 42. The current sensing circuit 72 has an output 74 connected to an input of the switching control circuit 54.

Challenges from Recent Technological Developments

Gel Batteries Although the gel batteries exhibit several significant advantages over flooded cell batteries, gel batteries also have some limitations that are more critical than corresponding limitations of flooded cell batteries. All batteries suffer damage if they are charged to an excessive voltage or are discharged to a voltage that is too low because the electrolyte chemistry and the battery's plates are changed in an undesirable manner. Such an overvoltage or undervoltage does not cause any significant damage if it exists for only a short duration. But the damage becomes cumulatively significant from long term overvoltage or undervoltage which reduce the useful life of the battery. The most damage to a battery results from long term overcharging to an excessive voltage above the battery's float voltage and long term undercharging below a minimum voltage.

Gel batteries are more susceptible to damage from overvoltage and undervoltage than conventional flooded cell lead acid batteries. A relatively small overvoltage for a gel battery causes significant damage. The flooded cell battery can easily withstand a voltage of 15.25 volts and is not damaged by 15.5 volts. The gel battery has a float voltage or maintenance voltage of about 14.5 volts. That voltage that can be maintained long term on the gel battery without damage and compensates for internal discharge of the battery. The gel battery, unlike the flooded cell battery, is damaged by a voltage that exceeds its float voltage and is easily damaged and quickly destroyed by that same 15.5 volts that does not damage a flooded cell battery. The reason this is important is that modern vehicle alternators sometimes reach 15.5 volts, for the reasons described below, because they are designed and controlled to maintain the charge on a flooded cell chassis battery and not on a gel battery. Although I am not aware of a manufacturer's specification for a minimum low battery voltage, I believe that damage occurs to a gel battery at a battery voltage below 10 volts.

Chassis Electrical Power Systems Vehicle manufacturers design the vehicle's chassis power system so that it is compatible with the vehicle's flooded cell battery. The power system is understandably not designed to be compatible with the differing characteristics of a gel battery. The voltage that is applied to the power generator node 44 of a battery protection circuit is outside the control of a battery protection circuit. If the vehicle's chassis power system applies a voltage to the power generator node 44 of a battery protection circuit that does not damage the vehicle's flooded cell battery but would damage an auxiliary gel battery, the battery protection circuit should protect the gel battery from such a gel battery overvoltage.

A problem arises because vehicle manufacturers are making alternator controls that permit the chassis battery and alternator voltage to vary over a wide voltage range in response to various differing conditions in order to improve vehicle fuel efficiency and increase mileage. Under some conditions, the chassis electrical power system voltage is permitted to reach as high as 15.5 volts. Under other conditions, the alternator is turned off so that electrical power is supplied to chassis loads from only the chassis battery. For example, modern chassis electrical power systems turn off the alternator when vehicle is under heavy load, such as when going up a hill, in order to reduce the load on the vehicle's engine and thereby improve fuel economy. To further improve fuel efficiency, some vehicles automatically turn off the vehicle engine when the vehicle has been stopped and idling for some period of time. If the chassis battery becomes discharged to a low voltage that would damage a gel battery, the protection circuit should protect an auxiliary gel battery from that low voltage. Furthermore, when the alternator has not been charging the battery for either reason, when the alternator resumes charging, the chassis battery must be recharged more quickly than usual because the alternator has not been charging it for some time. In order to speed up the recharge, the alternator is controlled to generate a larger voltage. In the past the maximum alternator voltage would be relatively constant, such as 14 volts. But now, at times, the voltage is increased as high as 15.25 or 15.5 volts to speed the recharge. So the modern changes to chassis electrical power systems have introduced an incompatibility between the fuel economy improvement scheme and the use of different battery types. Chassis electrical power systems have voltages that vary over a broader range including to voltage levels that are high enough to damage or destroy a gel cell battery, because the chassis electrical power system is designed for flooded cell batteries. This has made it more difficult to protect gel batteries with respect to their more critical limitations.

Switch Control Logic

General Processor and Software Operation The digital processor of the control 54 controls the state of the switches and repeatedly senses the voltage V1 across the chassis battery B1 and the voltage V2 of the auxiliary battery B2. Additionally and optionally, it also senses auxiliary battery current I2 and auxiliary load voltage VL and has a clock for computing elapsed time. The control circuit compares present values to limits. The present values are either currently sensed values or values computationally derived from currently sensed values. The limits are baseline values that are thresholds at boundaries between two conditions as selected by the designer based upon the designer's technical judgments. By comparing each present value to an associated limit, the control 54 determines whether a battery or circuit condition has been reached. For example, one limit selected by the designer is a maximum permissible charge state for the auxiliary battery. Because battery voltage is an indicator of battery charge state, the designer could use the auxiliary battery's float voltage as the maximum permissible charge state limit and compare that voltage to the present voltage. More likely the designer would select a maximum permissible charge state limit that is a few tenths of a volt lower than the float voltage to provide a safety margin.

The limits can be stored constant values selected by the designer or values derived by an algorithm selected by the designer from a past history of currently sensed values. In making the above comparisons, the digital processor determines whether each present value is greater than [>], greater than or equal to [≥] ("at least"), less than or equal to [≤] or less than [<] a particular limit that is associated with each present value. Based upon the results of the comparisons and their interpretation in accordance with the control algorithms, one or both of the first switch 40 and the second switch 42 are switched to open or closed states or their states are not changed. Consequently, in the operation of the control 54, commands from the digital control 54 to the switches 40 and 42 are generated by the software based upon its comparison of the selected limits to present values obtained from currently sensed values. The software compares the sensed values, or a value derived from the sensed values, to stored limits so that, when a sensed value transitions to a limit value, or above or below a limit value, a command to open or close a switch is output to the switch if the logic conditions in the software are met.

Limits There are several limits that are or can be utilized by the control algorithm of the control circuit 54 of the invention. Each limit represents an important state of a battery or the circuit. Some limits are nearly always used and others are optional limits that can additionally be used. The principal limits are an auxiliary battery maximum permissible charge state, an auxiliary battery minimum permissible charge state, whether the auxiliary battery is receiving a charging current, and whether the power generator node is capable of charging the auxiliary battery. The values of these limits are different for different types of batteries and can vary among different battery designs of the same battery type. Consequently, they must be chosen by the circuit designer.

Although these limits can be stored constants that are not varied, alternatively the limits can be varied. Limits can be computed from measurable parameters, such as voltages, currents, temperature and time. For example, a battery temperature sensor can be included with an embodiment and connected to the control 54. Any one or more of the limits can then be varied as a function of temperature. The inclusion of a clock in the control 54 allows the limits to be varied as a function of age.

Some present values and some limits can be computed over an interval of time so they are based upon the history of a battery's use, such as from the time a new battery is installed to the present. For example, the control 54 can periodically record and integrate with respect to time the ampere-hours of battery use and then vary limits in a manner chosen by the designer as a function of ampere-hours of operation over a selected interval of time. The control 54 can periodically record and integrate with respect to time the effective number of deep cycle discharges during battery use and then vary limits in a manner chosen by the designer as a function of the number of deep cycles experienced during operation over a selected interval of time.

A limit can also be defined as two nearby values instead of as a single value in order to provide hysteresis. It is common for a sensed value to vary over a short time period, repeatedly increasing and decreasing over a small range. If the boundaries of that small range fall on opposite sides of a limit, the control 54 can repeatedly reverse the state of a switch each time a sensed value transitions across the limit. Where the designer wishes to avoid such excessive switching, the limit can be defined as two nearby values.

Charge State of a Battery

Two of the comparisons made by embodiments of the invention are directed to the charge state of the auxiliary battery. Each comparison involves comparing the present charge state of a battery to a charge state limit. More than one parameter can indicate the present charge state of a battery which the control 54 compares to one or more charge state limits. The state of charge of the battery indicates the concentration of the electrolyte.

A battery charge state can be indicated by the battery voltage but that is an approximation that depends upon battery current. After a rest period with no load, battery voltage is a good indicator of battery charge state. When there is a light load on the battery, there is an approximate but reasonably accurate correlation between battery voltage and battery charge state. At higher current, the internal resistance of the battery becomes a more significant factor. So the battery voltage becomes a less accurate indicator of battery charge state. As a battery ages and is cycled through charging and discharging, the battery voltage becomes a less accurate indicator of the charge state. However, it is practical to choose voltages as indicators of battery charge state, particularly if safety margins are provided.

The charge state of a battery can be indicated by other parameters and there may be still others in the future. The charge state of a battery can be indicated by the net ampere-hours that the battery has experienced. Batteries specifications usually rate a battery for some quantity of ampere-hours of operation during its normal life expectancy. The control 54 can monitor the ampere-hours that a battery has experienced from its installation as a new battery to the present. The current sensing input to the control 54 continuously mathematically integrates the charging and discharging currents of the battery with respect to time from installation to the present. The result of that integration is the present ampere-hours experienced by the battery. That present value of ampere-hours is compared to a baseline limit such as the ampere-hour rating by the manufacturer. Alternatively, instead of using the manufacturer's rating, the ampere-rating can be experimentally determined using the industry standard criteria.

Limit—Auxiliary Battery Maximum Permissible Charge State

The auxiliary battery maximum permissible charge state is the maximum charge state that the designer wants to allow the auxiliary battery to be charged to because battery damage is likely at a higher charge state. In a preferred embodiment of the invention, the baseline auxiliary battery maximum permissible charge state limit can be a voltage equal to the maximum continuous float charge voltage as given by the manufacturer's specifications for the auxiliary battery. For a gel battery a typical value is 14.5 volts. The float voltage differs between flooded cell and gel cell batteries and also varies among different gel cell batteries. Therefore, the maximum permissible charge state selected by a designer would also differ for different battery types. Preferably, the designer will provide a safety margin by choosing a voltage that is offset by a few tenths of a volt lower than the float voltage, for example a value of substantially 14.3 volts. With that value, the control circuit will compare the sensed present value of the auxiliary battery voltage to 14.3 volts. In this instance the control 54 evaluates the logical statement whether V2>14.3 volts. Because the float charge voltage decreases as battery temperature rises, if a battery temperature sensor is included with an embodiment of the invention, the designer may program the control 54 with an algorithm for correspondingly decreasing the auxiliary battery maximum permissible charge state limit as a function of increasing temperature.

Limit—Auxiliary Battery Minimum Permissible Charge State

The designer selects a minimum permissible state of charge of the auxiliary battery. It is the lowest charge state that the designer wants to allow the auxiliary battery to discharge to because damage is likely at a lower voltage. An excessively deep discharge will reduce the number of lifetime deep cycle discharges that the auxiliary battery will provide. So the protection circuit prevents further discharge by the auxiliary load in order to protect the battery from damage from being undercharged.

The voltage of the auxiliary battery may be used as the indication of its present, currently sensed charge state. Because I believe that a charge state indicated by a gel battery voltage of 10 volts is the least voltage that a gel battery can discharge to without damage, I have used that as a guideline minimum voltage. I selected a minimum permissible charge state for an auxiliary battery voltage of substantially 10.3 volts in order to provide a 0.3 volts safety margin. Other charge state indicators can be used, such as those previously described. The minimum permissible charge state can alternatively be varied according to an algorithm chosen by the designer. For example, it can be varied as a function of temperature or using the integration techniques previously described.

Limit—Auxiliary Battery is Receiving a Charging Current

A feature of the invention is that the inherent diode 70 of the second switch 42 allows charging current to flow even when the second switch 42 is open.

The control 54 can monitor that current and use it, when charging, to close the second switch 42 when the presence of a charging current is detected. If there is a charging current that is charging the auxiliary battery through the inherent diode 70 of the second switch 42, that indicates that the auxiliary battery is receiving charging current and will be charged by a greater current by closing the second switch 42. The control 54 can be programmed to require the presence of a charging current for some period of time before closing the second switch 42. If the embodiment of the invention has a current sensing circuit 72 as illustrated in FIG. 3, that circuit can be used to detect whether there is an auxiliary battery charging current; that is, whether I2>0. The limit for indicating that the auxiliary battery is receiving a charging current is 0 amperes. Alternatively, in the event that the embodiment of the invention does not have a current sensing circuit 72, the control 54 can compare the auxiliary load voltage VL at the node 48 to the auxiliary battery voltage V2 at the node 46. If VL is greater than V2, Ohm's law says that the auxiliary battery is receiving charging current. Otherwise it is not. Therefore, in this case the limit for indicating whether the auxiliary battery is receiving a charging current is 0 volts.

An additional advantage of including the current sensing circuit 72 in an embodiment of the invention is that it can also be used to sense the presence of an overload current and open the second switch 42 in the manner of a circuit breaker or limit the overload current.

Limit—Voltage Capable of Charging the Auxiliary Battery

For multiple reasons it is desirable that the first switch 40 of embodiments of the invention be closed only when the voltage VL at the power generator node 44 is capable of charging the auxiliary battery; that is, the alternator voltage should be sufficiently high that it is certain that the auxiliary battery will receive charging current if the alternator were connected to the auxiliary battery. A voltage that is capable of charging the auxiliary battery is not simply a sensed alternator voltage that is greater than the sensed auxiliary battery voltage. The reason is that, if the first switch 40 is closed, the auxiliary load L2 will draw alternator current and, as a result, the alternator voltage V1 could drop to a voltage lower than the auxiliary battery voltage V2. For example, if the auxiliary battery voltage were 11 volts and the alternator voltage is 12 volts, upon closing of the second switch 40, the alternator voltage could drop below 11 volts because of the additional current drawn from the alternator by the connection of the parallel low resistance auxiliary load across the alternator and chassis battery. In that case, the chassis battery would be getting discharged and the auxiliary battery would not be getting charged. Therefore the designer chooses a value of alternator voltage that is at least high enough that, if maintained after closing the first switch 40, he knows will charge the auxiliary battery.

For the preferred embodiment of the invention, I have selected substantially 12.8 volts and substantially 12.9 volts for the limit that defines and distinguishes a voltage capable of charging an auxiliary battery from a voltage that is not capable of charging the auxiliary battery. My reasons are these. A flooded cell battery when fully charged has a rest voltage in the range of 12.60 to 12.75 volts and a gel cell battery is fully charged when its rest voltage is 12.9 volts or higher. Any higher voltage across the terminal of either battery indicates that a charging current is flowing through the battery. Therefore, any alternator voltage above 12.9 volts means that, if the alternator voltage is applied to the auxiliary battery, it will charge the auxiliary battery. It also means that the chassis battery is either fully charged or is being charged and is near fully charged so that the chassis battery will be available to start the vehicle. Any alternator voltage at or below 12.8 volts may not charge the gel cell auxiliary battery and may discharge the flooded cell chassis battery. The two values of substantially 12.8 volts and substantially 12.9 volts are preferred as the limit for the voltage capable of charging the auxiliary battery. Because they are above the typical rest voltage for a fully charged flooded cell chassis battery, they also provide a safety margin. A safety margin is desirable because there can be resistance drops in the circuit that would lower the sensed voltage. Of course a designer may choose to use values for this limit that differ slightly from the preferred values. Two slightly different value are used, instead of a single value, in order to introduce some hysteresis and thereby prevent a high switching rate between the open and closed state of switch 1 (as a result of the chassis battery voltage varying between a little above and a little below a single voltage value). The hysteresis provides a guard band of 0.1 volts. Both values also represent a sufficient charge state to assure that the chassis battery can start the engine. In practical operation, the alternator voltage will normally be considerably above or considerably below those voltage values so a single voltage value can be used as the voltage capable of charging the auxiliary battery.

Of course the same concepts apply to batteries of other voltages, e.g. 24 volt military batteries. However, the corresponding voltage values will be different. Similarly to the other limits, the limit that is the voltage capable of charging the auxiliary battery, can be a selected constant voltage value, or a selected value that is varied as a function of another parameter such as temperature, age, accumulated deep cycle discharges or ampere-hours of battery operation.

The Control Algorithm and its Boolean Logic Criteria

As described above, the software repeatedly cycles through reading the sensed values V1, V2 and, if used, VL and I2. If the limit parameters that are selected by the designer are constant voltage and current values, the sensed values are compared to the related stored limit values to determine whether the sensed values are equal to, above or below the corresponding stored limits. The control logic criteria are then applied to the results of the comparisons to determine whether a command is given to a switch to open or close, and, when logic criteria are met, to output a command. If the limit parameters are varied as a function of a parameter, such as temperature, the limit parameters must first be varied before performing the previous step. To do that, the temperature is sensed, the algorithm for varying the limit parameters is applied to define the modified limit and then the foregoing steps are performed.

The preferred algorithm that is programmed into the control 54 for operating embodiments of the invention is described in terms of capitalized Boolean logic operators AND, OR and NOT. These are mathematical operators and have the meaning given in Boolean algebra. The preferred algorithm is as follows:

(a) close the first switch 40 when the voltage V1 at the power generator node 44 is at least a designer selected voltage capable of charging the auxiliary battery (for example V1≥2.9 volts);

(b) open the first switch 40 when the voltage V1 at the power generator node 44 is less than the designer selected voltage capable of charging the auxiliary battery OR the auxiliary battery B2 voltage V2 exceeds a designer selected auxiliary battery maximum permissible charge state (for example: V1<12.8 volts OR V2>14.3 volts);

(c) close the second switch 42 when the auxiliary battery B2 has a state of charge that is at least a designer selected auxiliary battery minimum permissible charge state OR when the auxiliary battery B2 is receiving a charging current I2; (for example V2>10.3 volts OR I2>0 amps); and (d) open the second switch 42 when neither condition for closing the second switch 42 is present; that is, when the auxiliary battery B2 has a state of charge that is NOT at least the designer selected minimum permissible state of charge AND the auxiliary battery is NOT receiving a charging current I2 (for example: V2<10.3 volts AND I2≤0 amps).

Although there are alternative ways of evaluating these conditions, preferably the designer selected voltage capable of charging the auxiliary battery is a constant DC voltage and most preferably a voltage substantially in the range of 12.8 to 12.9 volts. Both values are advantageously used to provide hysteresis. Preferably, the designer selected auxiliary battery maximum permissible charge state is a constant auxiliary battery voltage and most preferably is substantially 14.3 volts. Preferably, the designer selected auxiliary battery minimum permissible charge state is a constant auxiliary battery voltage and most preferably is substantially 10.3 volts.

As seen from the previous description, the control algorithm is stated in terms of four logical statements: one for opening the first switch; one for closing the first switch, one for opening the second switch and one for closing the second switch. The following are alternative logic criteria for each of the four.

Close the First Switch

Additional protection of the auxiliary battery from being overcharged can be inserted in the control algorithm by imposing an additional condition upon condition (a) for closing the first switch 40. The additional condition is that the voltage across the auxiliary battery is less than the auxiliary battery's maximum permissible charge state. With that addition the conditions become close the first switch 40 when the voltage V1 at the power generator node 44 is at least a designer selected voltage capable of charging the auxiliary battery AND the voltage across the auxiliary battery is less than the auxiliary battery's maximum permissible charge state. (for example V1≥12.9 volts AND V2<14.3 volts)

Open the First Switch

Although slightly reducing the protection of the auxiliary battery, the logic criteria for opening the first switch 40 can be to open the first switch 40 when the voltage V1 at the power generator node 44 is less than the designer selected voltage capable of charging the auxiliary battery (for example V1<12.8 volts).

Close the Second Switch

Although the preferred control algorithm closes the second switch 42 when the auxiliary battery B2 has a state of charge that is at least a designer selected auxiliary battery minimum permissible charge state OR when the auxiliary battery B2 is receiving a charging current I2, (for example V2>10.3 volts OR I2>0 amps) either of these two logic criteria could be used alone for closing the second switch 42.

Open the Second Switch

For those circuits that do not include a current sensing circuit and the designer does not want to use detection of the voltage across the second switch to detect current, the second switch 42 can be opened when the auxiliary battery B2 has a state of charge that is NOT at least the designer selected minimum permissible state of charge (for example: V2<10.3 volts).

The principal purpose of the second switch 42 is to protect the auxiliary battery from overcharge and undercharge. For that purpose, it is desirable to open the second switch 42 when the auxiliary battery's state of charge is above its maximum permissible charge state or below its minimum permissible charge state. As mentioned above, in addition to battery voltage, the charge state can be determined in alternative ways, one of which is by integration with respect to time of a sensed parameter. For example, the auxiliary battery's present charge state can be determined by integrating the auxiliary battery's current, including both charging and discharging current, beginning from a time that the auxiliary battery was in a fully charged state. The result of that integration is the net ampere-hours delivered by the auxiliary battery since it was fully charged. The control 54 can also obtain the value of an integral that would be obtained by integrating the auxiliary battery's current, including both charging and discharging current, from a fully charged state to a fully discharged state. The result of the second integral is the ampere-hour capacity of the battery. For a new battery, that ampere-hour capacity should equal the manufacturer's ampere-hour rating for the battery. Consequently, the ampere-hour capacity of the battery can be the stored manufacturer's ampere-hour rating of the battery. Alternatively, the control 54 can compute a measured ampere-hour capacity of the battery by storing an integrated value of the integral that it computes at a time during its operation when it was discharged from a fully charged state to a fully discharged state. The control then computes a fraction (or a percentage by multiplying by 100) by dividing the present value of the integrated battery current by the ampere-hour capacity of the battery. That fraction represents the present charge state of the battery. The designer can select a value for that fraction as the minimum permissible charge state of the auxiliary battery and another value of that fraction as the maximum permissible charge state of the auxiliary battery.

ADDITIONAL DEFINITIONS

The term "switch" as used in this description has its ordinary meaning to those skilled in the art. The switches used in embodiments of the invention must be switches that are capable of conducting the high electrical currents that are common in vehicle auxiliary power systems. They also must be electrically controlled so they can be switched between open and closed states by a digital processor. Those skilled in the art will recognize that there are various types of solid state devices as well as electromechanical devices, such as relays, that are used as electrically controlled switches and can be used in embodiments of the present invention. In the current state of technology, MOS/FETs are the preferred high current switches.

The terms "substantially", "substantially 14.3 volts", "substantially 10.3 volts" and "substantially in the range" of 12.8 volts to 12.9 volts are used in this explanation and in the claims. These terms are used because the selection of exactly a particular value is not critical. Departures from the preferred values by a volt or more would so seriously degrade battery usefulness or life expectancy or both that their use would be impractical. The values given in this description are believed to be optimum. But there is a range of variation of less than a volt that will still work but not as effectively because there would be degradation of effectiveness in proportion to the amount of departure from the optimum values. Some variations will result in less than full utilization of the power supplying capability of the auxiliary battery. Other variations will allow some auxiliary battery damage. For example, a reduction in battery useful life is likely if the minimum auxiliary battery permissible charge state is set more than 0.3 volts lower or the maximum auxiliary battery permissible charge state is set more that 0.3 volts higher. The minimum auxiliary battery permissible charge state can be set higher and the maximum auxiliary battery permissible charge state can be set lower but that would result in under-usage of the capabilities of an auxiliary battery.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A protection circuit for controlling the charge and discharge of an auxiliary battery of a multi-battery power supply and charging system, the multi-battery power supply and charging system including a chassis storage battery for supplying electrical power to chassis loads, the auxiliary storage battery for supplying electrical power to auxiliary loads, and an electrical power generator for charging the batteries and supplying electrical power to the loads, the electrical power generator, the batteries and the loads each having an ungrounded terminal and each having a grounded terminal connected to a common ground, the ungrounded electrical power generator terminal being connected to the ungrounded chassis battery terminal, the protection circuit comprising:

(a) circuit node connection terminals including an electrical power generator node for connection to the ungrounded terminal of the electrical power generator, an auxiliary battery node for connection to the ungrounded terminal of the auxiliary storage battery, an auxiliary load node for connection to the ungrounded terminal of the auxiliary load and a ground node for connection to the common ground;

(b) a switching control circuit including a digital processor, the control circuit having a voltage sensing circuit connected to the power generator node, a voltage sensing circuit connected to the auxiliary battery node, a ground terminal for connection to the common ground and outputs for controlling switches;

(c) an electrically controlled first switch connected between the power generator node and the auxiliary load node, the first switch having a control input terminal connected to an output of the control circuit for being switched between a closed state and an open state by the control circuit;

(d) an electrically controlled second switch connected between the auxiliary load node and the auxiliary battery node, the second switch having a control input terminal connected to an output of the control circuit for being switched between a closed state and an open state by the control circuit.

2. A protection circuit in accordance with claim 1 and further comprising a current sensing circuit in series with the second switch and interposed between the auxiliary battery node and the auxiliary load node for sensing the auxiliary battery current, the current sensing circuit having an output connected to an input of the switching control circuit.

3. A protection circuit in accordance with claim 2 and further comprising a voltage sensing circuit connected to the auxiliary load node and having an output connected to an input of the switching control circuit.

4. A protection circuit in accordance with claim 1 and further comprising a voltage sensing circuit connected to the auxiliary load node and having an output connected to an input of the switching control circuit.

5. A protection circuit in accordance with claim 1 wherein the first switch has only one MOS/FET in series connection between the power generator node and the auxiliary load node and the second switch has one MOS/FET in series connection between the auxiliary load node and the auxiliary battery node.

6. A protection circuit in accordance with claim 5 wherein the MOS/FET of the second switch includes an inherent diode and is connected with the anode of the diode connected to the auxiliary load node and cathode of the diode connected to the auxiliary battery node.

7. A protection circuit in accordance with claim 6 and further comprising a current sensing circuit in series with the second switch and interposed between the auxiliary battery node and the auxiliary load node for sensing the auxiliary battery current, the current sensing circuit having an output connected to an input of the switching control circuit.

8. A protection circuit in accordance with claim 7 and further comprising a voltage sensing circuit connected to the auxiliary load node and having an output connected to an input of the switching control circuit.

9. A protection circuit in accordance with claim 1 wherein the switching control circuit has stored instructions that
(a) close the first switch when the voltage at the power generator node is at least a designer selected voltage capable of charging the auxiliary battery;
(b) open the first switch when the voltage at the power generator node is less than the designer selected voltage capable of charging the auxiliary battery OR the auxiliary battery voltage exceeds a designer selected auxiliary battery maximum permissible charge state;
(c) close the second switch when the auxiliary battery has a state of charge that is at least a designer selected auxiliary battery minimum permissible charge state OR when the auxiliary battery is receiving a charging current; and
(d) open the second switch when the auxiliary battery has a state of charge that is NOT at least the designer selected minimum permissible state of charge AND the auxiliary battery is NOT receiving a charging current.

10. A protection circuit in accordance with claim 9 wherein
(a) the designer selected voltage capable of charging the auxiliary battery is a constant DC voltage;
(b) the designer selected auxiliary battery maximum permissible charge state is a constant auxiliary battery voltage; and
(c) the designer selected auxiliary battery minimum permissible charge state is a constant auxiliary battery voltage.

11. A protection circuit in accordance with claim 10 wherein
(a) the designer selected voltage capable of charging the auxiliary battery is substantially in the range of 12.8 to 12.9 volts;
(b) the designer selected auxiliary battery maximum permissible charge state is substantially 14.3 volts; and
(c) the designer selected auxiliary battery minimum permissible charge state is substantially 10.3 volts.

12. A protection circuit in accordance with claim 9 wherein the conditions for closing the first switch further require that the voltage across the auxiliary battery is less than the auxiliary battery's maximum permissible charge state.

13. A protection circuit in accordance with claim 1 wherein the switching control circuit has stored instructions that open the first switch when the auxiliary battery voltage exceeds a designer selected auxiliary battery maximum permissible voltage or charge state.

14. A protection circuit in accordance with claim 1 wherein the switching control circuit has stored instructions that close the first switch when the voltage at the power generator node is at least a designer selected voltage capable of charging the auxiliary battery.

15. A protection circuit in accordance with claim 1 wherein the switching control circuit has stored instructions that open the first switch when the voltage at the power generator node is less than a designer selected voltage capable of charging the auxiliary battery.

16. A protection circuit in accordance with claim 1 wherein the switching control circuit has stored instructions that close the second switch when the auxiliary battery has a state of charge that is at least a designer selected auxiliary battery minimum permissible charge state.

17. A protection circuit in accordance with claim 1 wherein the switching control circuit has stored instructions that close the second switch when the auxiliary battery is receiving a charging current.

18. A protection circuit in accordance with claim 1 wherein the switching control circuit has stored instructions that open the second switch when the auxiliary battery charge state is less than its minimum permissible charge state OR when the auxiliary battery charge state is more than its maximum permissible charge state.

19. A protection circuit in accordance with claim 18 wherein the switching control circuit has a stored ampere-hour capacity of the auxiliary battery and has stored instructions that compute the auxiliary battery's present charge state by integrating the auxiliary battery's current, including both charging and discharging current, beginning from a time that the auxiliary battery was in a fully charged state and has stored instructions for computing a fraction by dividing the present value of the battery's stored charge state by the stored ampere-hour capacity to obtain a fraction that represents the present charge state of the battery.

20. A protection circuit in accordance with claim 19 wherein the stored ampere-hour capacity of the auxiliary battery is computed by the switching control circuit by integrating the auxiliary battery's current, including both charging and discharging current, at a time during its operation when it was discharged from a fully charged state to a fully discharged state and storing that computed integral.

* * * * *